United States Patent [19]
Johnson

[11] Patent Number: 6,019,266
[45] Date of Patent: Feb. 1, 2000

[54] BICYCLE CARRIER FOR VEHICLE

[76] Inventor: Brian Johnson, 327 Wellsian Way, Richland, Wash. 99352

[21] Appl. No.: 08/910,450

[22] Filed: Aug. 5, 1997

[51] Int. Cl.[7] .................................. B60R 9/10; B60R 9/06
[52] U.S. Cl. ........................ 224/534; 224/521; 224/514; 224/525; 224/537; 224/924; 224/508
[58] Field of Search .................................. 224/924, 521, 224/525, 537, 534, 514, 504, 505, 506, 507, 508

[56] References Cited

U.S. PATENT DOCUMENTS

| D. 369,585 | 5/1996 | Gregory | D12/408 |
|---|---|---|---|
| 4,189,274 | 2/1980 | Shaffer | 224/924 |
| 5,025,932 | 6/1991 | Jay | 211/20 |
| 5,190,195 | 3/1993 | Fullhart et al. | 224/42.03 |
| 5,219,105 | 6/1993 | Kravitz | 224/532 |
| 5,330,084 | 7/1994 | Peters | 224/42.45 |
| 5,377,886 | 1/1995 | Sickler | 224/42.45 |
| 5,469,997 | 11/1995 | Carlson | 224/521 |
| 5,497,927 | 3/1996 | Peterson | 224/519 |
| 5,520,315 | 5/1996 | Graham | 224/924 |
| 5,526,971 | 6/1996 | Despain | 224/519 |

*Primary Examiner*—Linda J. Sholl
*Attorney, Agent, or Firm*—Marger, Johnson & McCollom, P.C.

[57] ABSTRACT

An improved bicycle carrying device for affixation to a vehicle, either to the bumper of the vehicle or to a permanent trailer hitch. The device comprises transverse support members to which the bicycle wheels are secured, and an upright member with elongate slots therein, within which adjustable, movable retaining members are affixed. The movable retaining members are moved into position such that they abut and are secured to an upper structural member of the bicycle. Therefore, the bicycle is restrained against lateral movement both at an upper and a lower position, securing the bicycle even during transport.

8 Claims, 6 Drawing Sheets

BICYCLE CARRIER FOR VEHICLE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to bicycle racks or carriers for carrying bicycles on vehicles. More specifically, the invention relates to bumper or hitch mounted bicycle carriers which are mounted to automobiles, RVs, bus, or the like.

Bumper and/or hitch-mounted bicycle racks or carriers for affixation to vehicles have been known for some time as a means of transporting bicycles, mopeds, and other light weight cycles. These carriers may be removably mounted to the vehicle bumper or may have male pinions for insertion into the frame-mounted female receptacle of a trailer hitch receiver. While such racks are generally mounted to the rear of the transporting vehicle, they may also be front end mounted, or adapted for affixation to the roof of the transporting vehicle.

Generally, such racks have been: adapted to carry more than one bicycle; generally two, either by supporting the bicycle from the wheels on a platform, or by hanging the bicycle from the frame. For example, U.S. Pat. No. 5,469,997 discloses a hitch-mounted bike rack wherein an upper arm for supporting the frame of a bicycle is provided with a plurality of holding brackets and a locking arm, so that the bicycle is retained by and hangs free on the rack. Rather than being suspended from the bicycle carrier, U.S. Pat. No. 5,497,927 discloses the alternative design whereby a pluality of transverse support members support a wheel of the bicycle. This design is representative of those wherein one wheel (generally the front wheel) must be removed so that lateral rigidity is provided by securing the front form member to the support member. Another bicycle rack illustrating this feature is disclosed in U.S. Pat. No. 5,377,886 wherein a bicycle is supported by the hitch and the front wheel is removed so that the fork may be secured to the rack.

U.S. Pat. No. Des. 369,585 discloses a bicycle rack wherein a clam-shell supporting member supports the cross member of a pair of bicycles.

Conventional prior art bicycle racks are disclosed in U.S. Pat. Nos. 5,190,195 and 5,330,084, wherein the upper crossbar of a bicycle is hung on a pair of hooks affixed to an upright member. The upright member in both cases may be pivoted away from the carrying vehicle for ease of entry into the vehicle, as through a trunk lid or rear hatch. An alternative means of securing the bicycle to the rack is disclosed in U.S. Pat. No. 5,025,932, wherein bicycle wheels are supported in rails, and the bicycle crank arms are retained in an upright post. Finally, U.S. Pat. No. 5,526,971 discloses a bicycle rack wherein the bicycles are stood on end, with the rear wheel retained in a rail and the front wheel removed and front forks secured to an upper fork mount.

Applicant has determined that bicycle carriers that support the bicycle from a platform provide greater stability and induce less torsional movement than do those racks that suspend the bicycle from the frame. However, as is evident from, for example, the '927 and '886 patents noted above, such carriers provide lateral stability by removing the front wheel and securing the front fork to the carrier. The inherent disadvantages of such devices are apparent: they require a partial disassembly of the bicycle; and because bicycles are somewhat top heavy, the only securement (at the base of the bicycle) creates a large (and potentially destructive) bending moment at the sole point of attachment.

Therefore, there is a need for at bicycle carrier that is easily affixed to a vehicle, provides both upper and lower support for the bicycle, and which requires no disassembly of the bicycle. Additionally, such carrier must be adjustable so as to be usable with a wide range of bicycle frame sizes and designs.

BRIEF SUMMARY OF THE INVENTION

In its broadest embodiment, the present invention comprises:

a. a first support member affixed to a vehicle, b. at least one second transverse support member affixed to the first support member, c. an upright member secured to the first support member having an elongate slot provided therein, and d. at least one movable retaining member movably affixed to the upright member which is retained by and moves within the elongate slot.

More specifically, the bicycle carrier of the present invention is adaptable to the total range of different bicycle frame designs, and is not limited to use with a particular frame configuration. The invention comprises a bicycle carrier which is affixed to either the bumper of a vehicle, or to a trailer hitch, such as a frame-mounted trailer hitch which is permanently affixed to the vehicle. In the case of a bumper-mounted device, a plurality of clamps are provided which secure the carrier to the bumper, and in the case of a hitch-mounted device, a pinion is provided which interfits with a hitch retainer member (the female receptacle) secured to the frame. One or more transverse support members (corresponding to the number of bicycles to be carried) are affixed to a first support member which mounts the carrier to the vehicle.

An upright member is pivotally secured to the first support member. The upright member is provided with an elongate slot to receive movable retaining members therein. The movable retaining members are adapted to abut an upper portion of the bicycle frame to prevent lateral movement of the bicycle. The movable retaining members move vertically within the elongate slot so as to adjust to differing sizes and shapes of bicycle frames. The bicycles are secured to the device both at the transverse support members upon which the bicycle wheels rest, and at the upright member, thereby restraining both the top and bottom of the bicycle. The upright member may pivot at its interconnection with the first support member so as to pivot away from the vehicle to permit entry into a trunk or hatch back.

It is therefore an object of the present invention to provide a bicycle carrier for a motor vehicle which is capable of carrying two or more bicycles without substantial movement of the bicycles even when the vehicle is subjected to rough road conditions. The device supports the bicycles from below while also restraining movement of the upper portion of the bicycle. Additionally, the bicycle carrier is easy to install, is light weight, and pivots out of the way for ease of entry into the vehicle. It is also an object of the present invention to provide a bicycle carrier that accepts the bicycle without disassembly of any portion of the bicycle.

These and other objects of the present invention will become apparent in the detailed description of the invention which follows.

BRIEF DESCRIPTION OF THE SEVERAL VIEWS OF THE DRAWINGS

The invention will be better understood and objects other than those set forth above will become apparent when consideration is given to the following description, which makes reference to the drawings, wherein.

DETAILED DESCRIPTION OF THE INVENTION

It will be readily appreciated by those skilled in this art that the various components of the present invention set forth herein, can be arranged and designed in a a wide variety of different configuration. Thus, the following more detailed description of the embodiments of the present invention is not intended to limit the scope of the invention, but it is merely representative of presently preferred embodiments of the invention.

Figure 1:
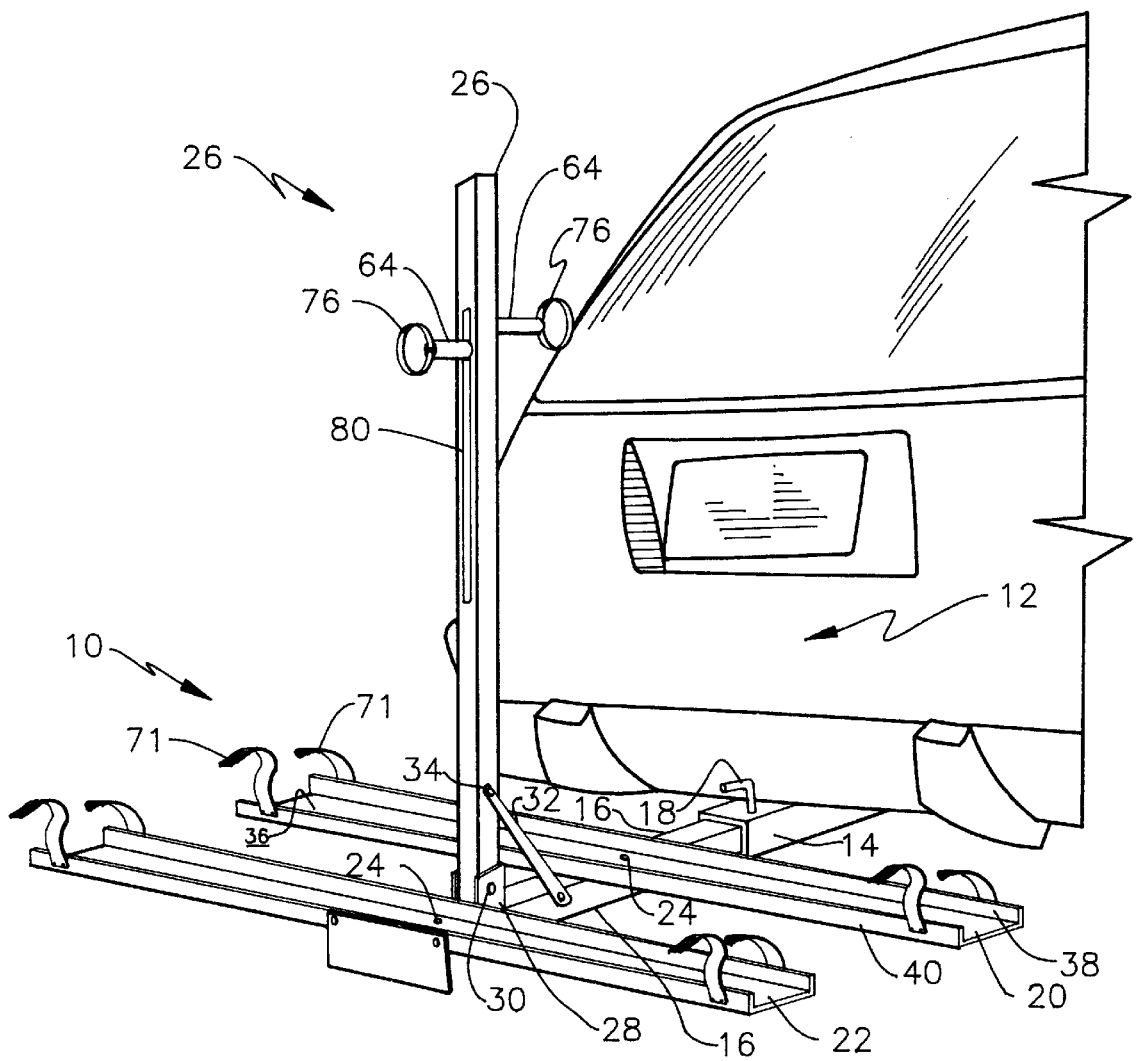
FIG. 1 is a perspective view of the apparatus of the present invention.
Figure 2:
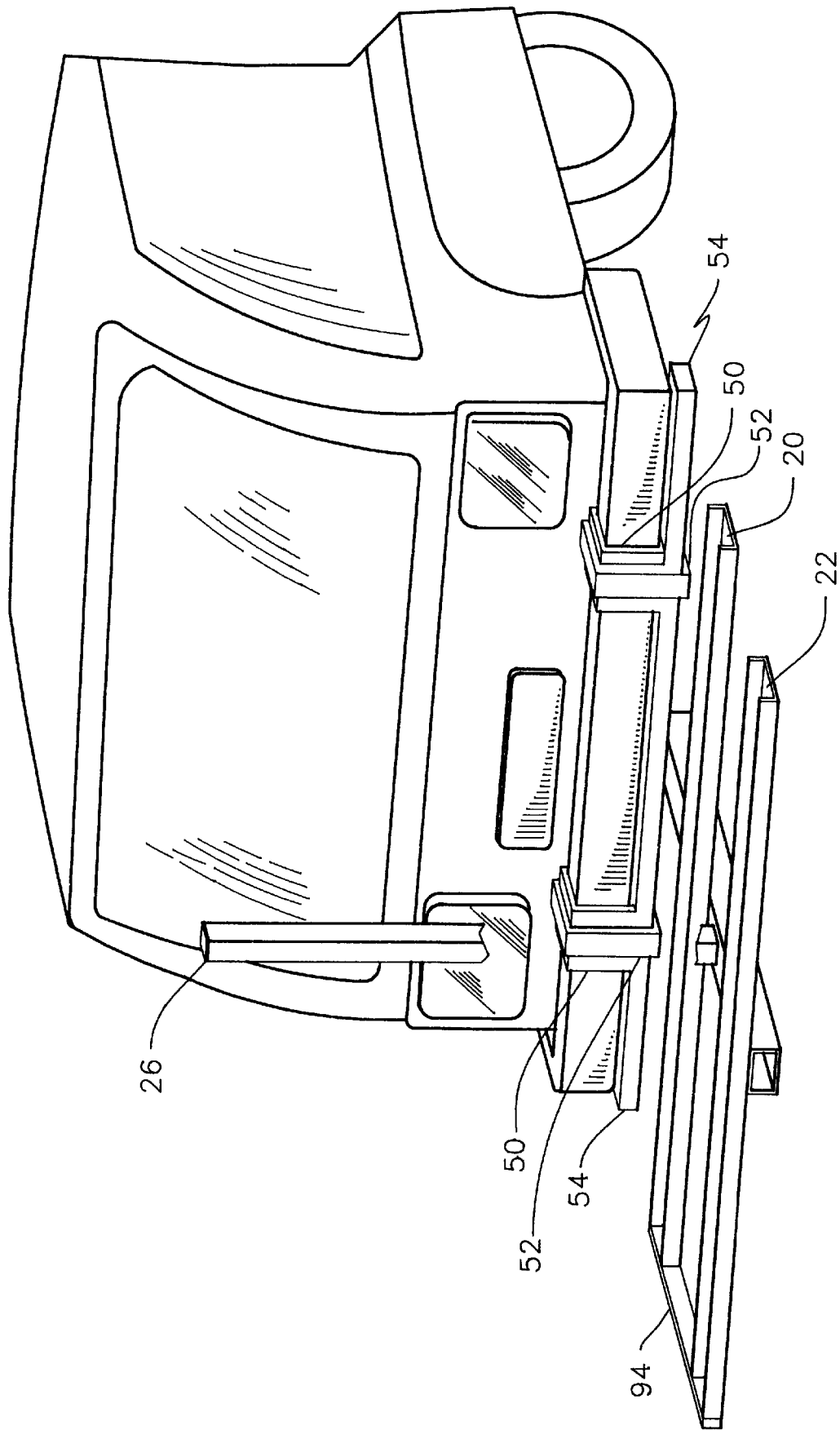
FIG. 2 is a partial view of the apparatus of the present invention as adapted for affixation to the bumper of a vehicle.

As illustrated in FIG. 1, the apparatus 10 of the present invention is adapted to be removably affixed to a vehicle 12. As illustrated in the drawings herein, for ease of illustration the vehicle is an automobile—it is to be understood that the vehicle can be a recreational vehicle, a bus, or any other vehicle adapted to carry one or more bicycles. Additionally, while the apparatus is illustrated in FIG. 1 affixed to the rear of the vehicle, it may also be affixed to the front of the vehicle, and in some cases (as with passenger buses), the preferred embodiment will be on the front. In the embodiment of FIG. 1, the device 10 is adapted to interfit with a hitch permanently secured to the vehicle. The female receptacle or hitch receiver 14 receives an elongate first support member 16 therein. The member 16 is securely retained within the receiver 14 by a pin 18 or other readily available device.

The device additionally comprises at least one second transverse support members 20, 22 which are affixed to the first support member 16 as by bolts or screws 24. An upright member 26 is likewise pivotally secured to the support member 16, as at bracket 28 with pin 30. Additional support for the member 26 is provided by bracket 32 which is removably secured to member 26 by removable pin 34. Applicant has found that the combination of lateral (side-to-side) support provided by the bracket 28 and axial (front-to-rear) support provided by the bracket 32 secures the upright member 26 without additional bracing.

The first support member 16 is preferably made of tubular stock having dimensions equivalent to that necessary to interfit with the hitch receiver 14. It is to be understood that while the invention is illustrated herein with a rectangular cross sectional configuration, any geometry of the structural members could be utilized. The second transverse support members 20, 22 may be of flat stock having a planar support surface 36 and a pair of side walls 38, 40 in the form of a channel. The side walls 38, 40 prevent the bicycle tires from slipping off the support surface 36 in the event minor axial movement of the tires occurs.

While the embodiment of FIG. 1 is the preferred embodiment, the device of the present invention may be adapted to interfit with vehicle bumpers in the event the vehicle does not have a permanent hitch as illustrated in FIG. 1. While the apparatus may be designed in a number of different ways, a plurality of clips 50 may be provided which hook over the upper surface of the bumper, which are interconnected with, for example, straps 52 which in turn are affixed to a rigid lateral member 54. The device is then affixed, as by welding, to the member 54, and is identical in all other respects.

Figure 3:
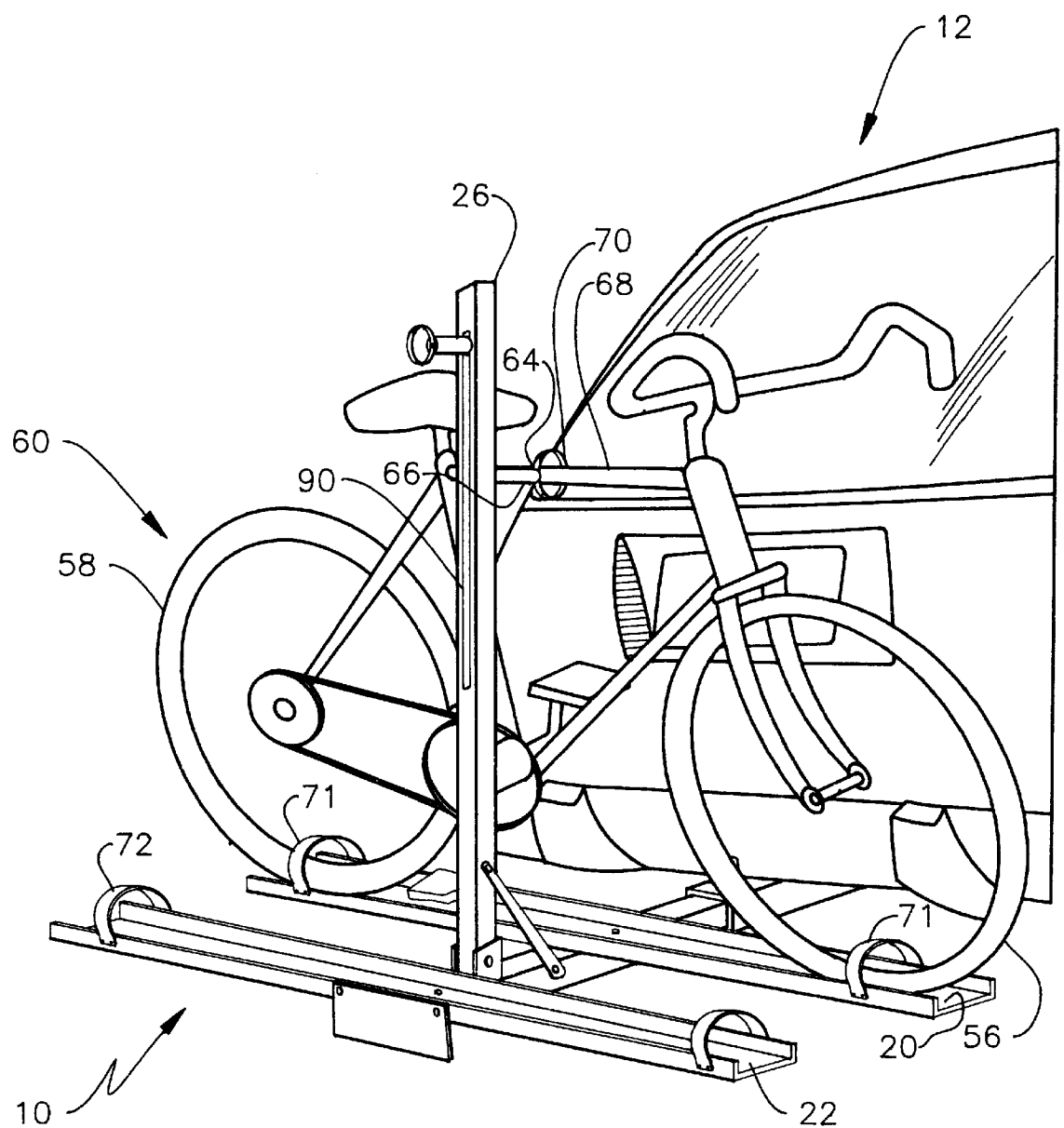
FIG. 3 is a perspective view of the apparatus of the present invention in an operative condition with a bicycle attached thereto.

FIG. 3 illustrates the present invention in use with a bicycle affixed thereto. It is to be understood that the device of the present invention is specifically designed to carry a pair of bicycles, however for ease of illustration a single bicycle is illustrated herein. The tires 56, 58 of bicycles 60 rest upon the second transverse support members 20, 22, one on either side of the upright member 26. In practice, the innermost bicycle 60 would be placed upon support member 20, and the inner movable retaining member 64 positioned such that the butt 66 of the member 64 abuts a structural member (such as cross bar 68) of bicycle 60. The member 64 is provided with securement means 70, such as an adjustable strap, to secure about structural member 68. The wheels of the bicycle 60 are secured to the support member 20 by securement means, such as straps 71. In this fashion, the bicycle is securely retained against the upright member 26.

After the first bicycle 60 is affixed to the device, the second (outer) bicycle is positioned on the second transverse member 22 and the outer movable retaining member 72 positioned such that the butt 74 thereof abuts the same (or different) structural member of the second bicycle. Securement means 76 secures the second bicycle to the device in like fashion.

Figure 4:
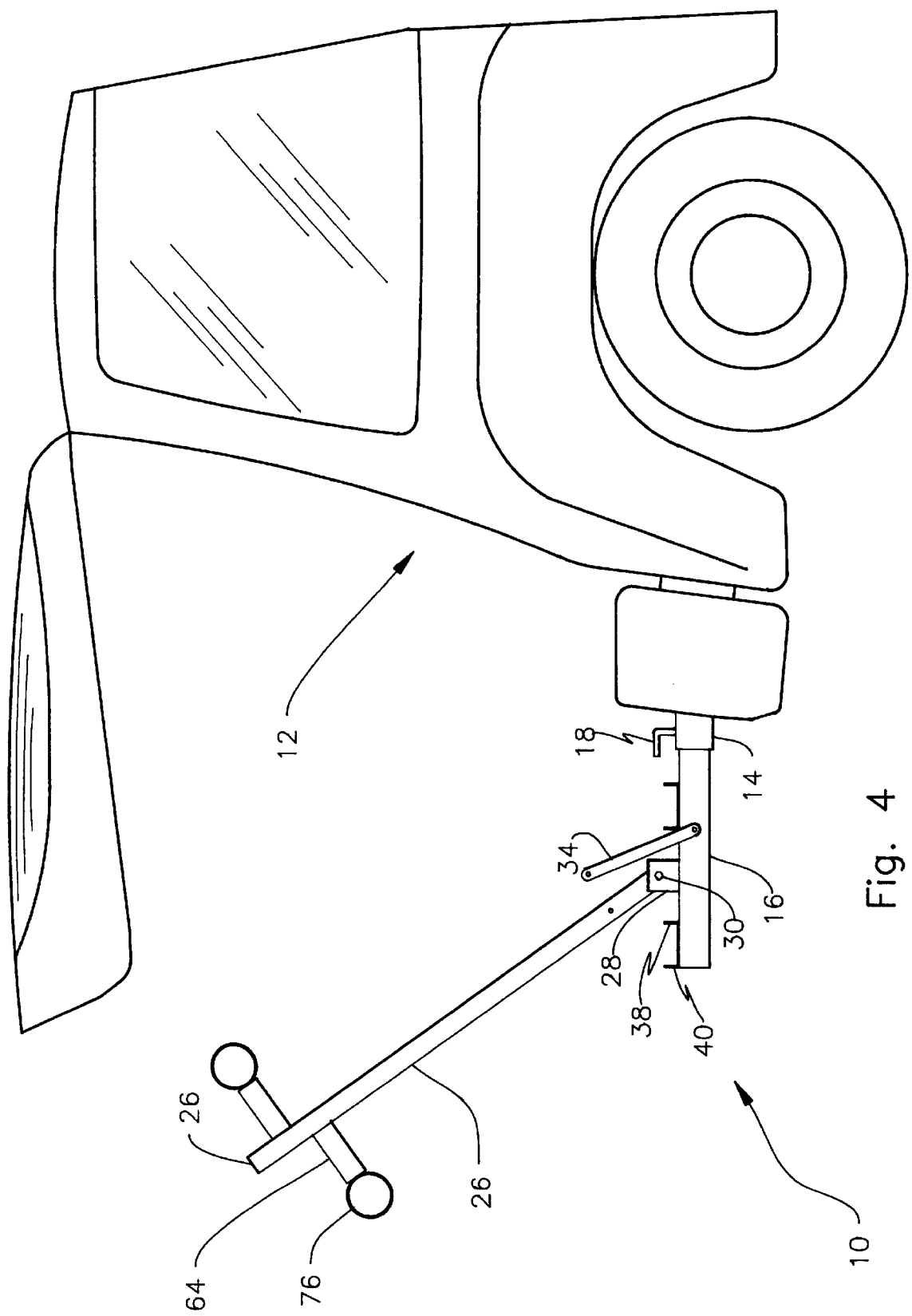
FIG. 4 is a perspective view of the apparatus of the present invention with the device pivoted for entry into the vehicle.
Figure 5:
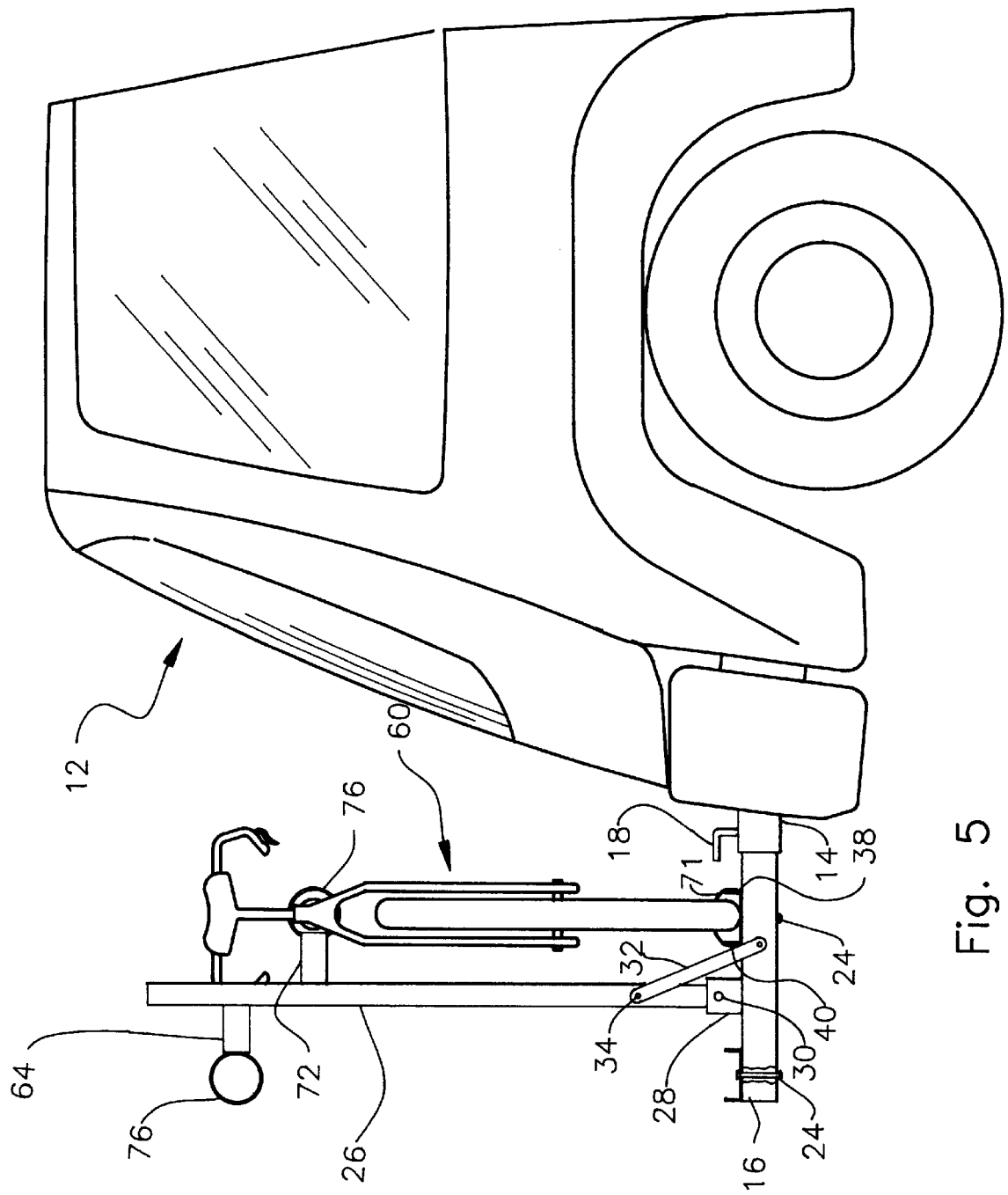
FIG. 5 is a side view of the apparatus of FIG. 1.

Entry into either the trunk of sedans or the hatch back of sport utility vehicles or vans will be difficult or impossible with the device 10 in place. In many prior art apparatus', the device must be removed completely from the vehicle to gain entry therein. Accordingly, the device of the present invention is provided with means to permit it to be pivoted out of position after the bicycles have been removed therefrom. As illustrated in more detail in FIG. 4, the pin 34 has been removed and the upright member 26 pivoted away from the vehicle about pivot pin 30. After entry into the vehicle is concluded, the device is simply pivoted back into position and pin 34 reinserted. In practice, the bottom edge of the upright member 26 may abut the support member 16, which in conjunction with pin 30 prevents forward movement of the member 26.

Figure 6:
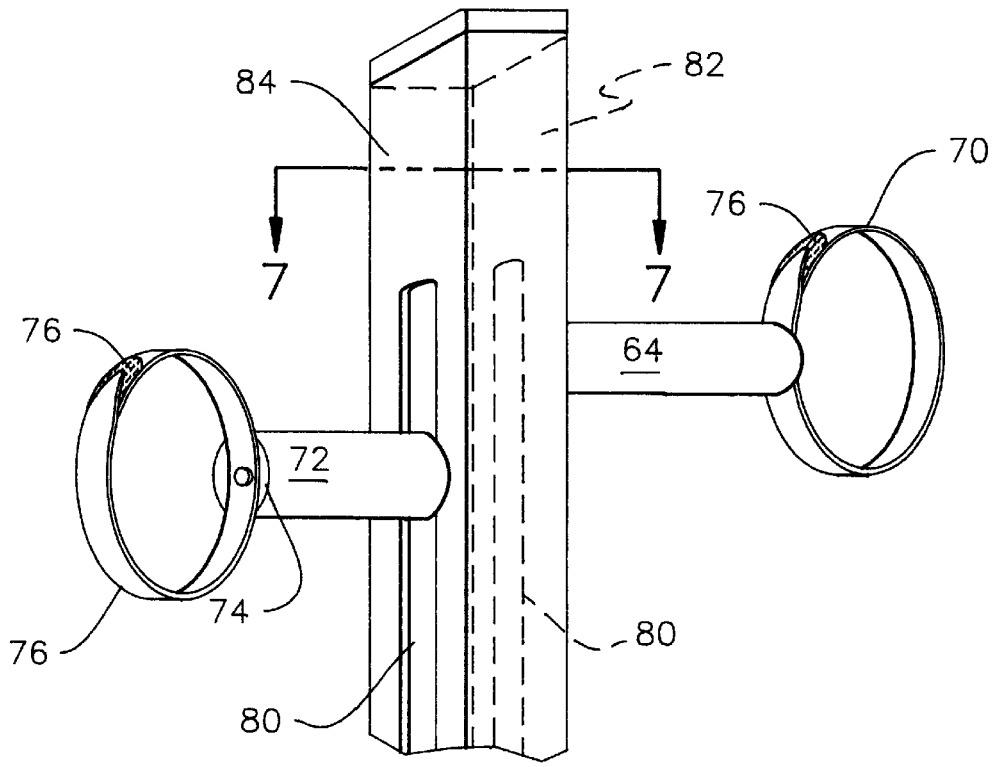
FIG. 6 is an enlarged view of a portion of the apparatus of FIG. 1.
Figure 7:
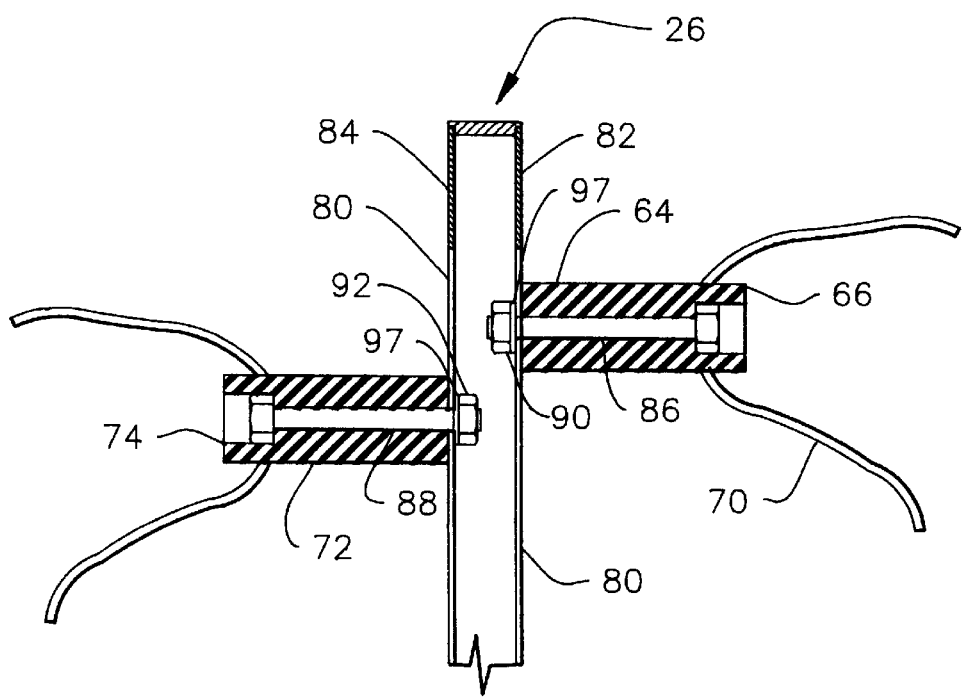
FIG. 7 is a partial sectional view taken along lines 7—7 of FIG. 5.

A unique aspect of the apparatus of the present invention is the ability to restrain lateral (side-to-side) movement of bicycles retained on the carrier. This is accomplished by providing movable retaining members 64, 72 movably affixed to the upright member 26. The upright member 26 is provided with an elongate slot 80 on both the forward facing 82 and rearward facing 84 sides of the member 26. The slot 80 must be provided over a range of expected movement so as to be adjacent an upper centralized structural member of the bicycle. The movable retaining members 64, 72 are provided with adjustable means, such as bolts 86, 88 adjustably secured to the member 26 with nuts 90, 92, which permit the members 64, 72 to be quickly and easily moved so that the butts 66, 74 are in engagement with a structural member of the associated bicycle, to be secured by straps 70, 76. The straps may be of any convenient latching mechanism, such as buckles, hook-and-pile fasteners, or the like. The apparatus of FIG. 6 permits the upper portion of the bicycle to be secured so as to prevent lateral movement during transport.

Therefore, it can be seen that by sliding the movable retaining members 64, 72 upwardly or downwardly on their adjoining file 82, 84 such that the butt ends 66, 74 of the members 64, 72 contacts the bicycle and is secured thereto by the associated strap, a pair of bicycles can be securely affixed to the upright member 26. The unique configuration of the present invention permits its use with bicycles having either conventional frames (with an upper horizontal frame member as illustrated in the Figures), or with newer design configurations without the upper horizontal frame member.

Braces 94 may be added to each end of the transverse support members 20, 22 to provide additional support. While it is believed that the apparatus as illustrated herein will have adequate structural rigidity, if necessary additional diagonal or lateral bracing between the support members 20, 22 may be added if necessary.

Preferred and alternative embodiments of the present invention have been described and illustrated in detail herein. Based upon this disclosure, those skilled in this art will be able to make modifications and improvements to this invention, which are to be considered within the scope of the invention. The invention should not be considered limited to the particular embodiments disclosed herein, but rather should be considered to encompass all such modifications and improvements. Accordingly, the scope of this invention should be limited solely by the scope of the claims appended hereto.

I claim:

1. A bicycle carrier device for affixation to a vehicle comprising:

a. a first support member adapted to be secured to the vehicle;

b. two transverse support members affixed to the first support member, each of the two transverse members being adapted to engage the wheels of and support a bicycle thereon;

c. an upright member positioned between the transverse support members and connected to the first support member, said upright member having two elongate slot openings provided therein, and said upright member being pivotable about a transverse axis; and d. two independently movable retaining members movably secured to the upright member, each of said retaining members being structured to move vertically within a respective one of said elongate slot openings such that each of said retaining members may be positioned at a desired vertical height and affixed to an upper portion of one of said bicycles.

2. The device of claim 1, wherein the first support member comprises clamp means for affixation to a bumper of said vehicle.

3. The device of claim 1, wherein the first support member comprises a pinion for insertion into a hitch retainer member permanently mounted to said vehicle.

4. The device of claim 1 wherein said upright member is pivotally connected to a first one of the two transverse support members such that the upright member may be pivotally moved away from said vehicle.

5. The device of claim 1, further including securement means located on each of the two transverse support members to securely retain each wheel of said bicycle to the transverse support member.

6. The device of claim 1 wherein said elongate slot openings are formed on opposing sides of said up right member.

7. The device of claim 1, wherein each of said movable retaining members is provided with securement means to enable the movable retaining member to be moved vertically within a respective one of the elongate slot openings from a first position and be secured to said upright member at a second position.

8. The device of claim 7, wherein each of said retaining members is provided with securement means to securely affix to an upper portion of said bicycle.

* * * * *